(12) United States Patent
Kanehisa et al.

(10) Patent No.: US 7,351,171 B2
(45) Date of Patent: Apr. 1, 2008

(54) BICYCLE HUB OUTER AND BICYCLE HUB

(75) Inventors: Takanori Kanehisa, Sakai (JP); Takuji Tatsumi, Sakai (JP); Kozo Kitagawa, Nishinomiya (JP)

(73) Assignee: Shimano Inc., Osaka (JP)

( * ) Notice: Subject to any disclaimer, the term of this patent is extended or adjusted under 35 U.S.C. 154(b) by 729 days.

(21) Appl. No.: 10/857,879

(22) Filed: Jun. 2, 2004

(65) Prior Publication Data

US 2005/0009654 A1    Jan. 13, 2005

(30) Foreign Application Priority Data

Jul. 9, 2003    (JP) .............................. 2003-272513

(51) Int. Cl.
*F16H 55/12* (2006.01)
*F16H 55/30* (2006.01)
*B60B 27/02* (2006.01)

(52) U.S. Cl. .............. 474/160; 301/111.02; 301/111.05

(58) Field of Classification Search ................ 474/152, 474/160, 162; 192/45–46, 64; 301/110, 301/10, 105.1; 403/359.2, 359.6
See application file for complete search history.

(56) References Cited

U.S. PATENT DOCUMENTS

| | | | | |
|---|---|---|---|---|
| 2,508,832 A | * | 5/1950 | McAninch | 403/359.6 |
| 5,129,711 A | * | 7/1992 | Chen | 301/110.5 |
| 5,324,100 A | * | 6/1994 | James | 301/110.5 |
| 5,513,733 A | * | 5/1996 | Fu | 192/64 |
| 5,518,096 A | * | 5/1996 | Lin | 192/64 |
| 5,632,364 A | * | 5/1997 | Mercat | 192/64 |
| 6,497,314 B2 | * | 12/2002 | Kanehisa | 192/64 |
| 7,011,592 B2 | * | 3/2006 | Shahana et al. | 474/160 |
| 2003/0171180 A1 | * | 9/2003 | Shahana et al. | 474/152 |

FOREIGN PATENT DOCUMENTS

FR    2814700 A1 *  4/2002
JP    8-175459 A    7/1996

* cited by examiner

*Primary Examiner*—Marcus Charles
(74) *Attorney, Agent, or Firm*—Global IP Counselors, LLP

(57) ABSTRACT

A rear hub has a hub shaft and a hub outer that is configured to be mounted in a freely rotatable manner to the hub shaft. The hub outer has an outer main body and an adapter. The outer main body is arranged on the radially inward side of a sprocket, and has a first rotation preventing section that engages with an engaging section 64 of the sprocket in such a manner that the outer main body cannot rotate relative to the sprocket. The adapter is mounted in a freely rotatable manner on an adapter mounting section of the outer main body. The adapter includes a second rotation preventing section that engages with the engaging section of the sprocket in such a manner that the adapter cannot rotate relative to the sprocket.

20 Claims, 5 Drawing Sheets

BICYCLE HUB OUTER AND BICYCLE HUB

BACKGROUND OF THE INVENTION

1. Field of the Invention

The present invention generally relates to a bicycle hub outer. More particularly, the present invention relate to a bicycle hub outer configured to be mounted in a freely rotatable manner to the hub shaft of a bicycle hub. The present invention also relates to a bicycle hub provided with such a bicycle hub outer.

2. Background Information

A bicycle is generally provided with a frame that constitutes the body framework of the bicycle and a rear hub for a rear wheel is generally connected to a rear end portion of the frame. The rear hub normally comprises a hub shaft arranged at the rotational center of the rear wheel, an outer and a hub shell mounted such that they rotate freely about the hub shaft, and a one-way clutch configured to connect the outer and the hub shell in such a manner that they can rotate relative to each other in only one direction. The hub shell is a cylindrical member to a radially outer portion of which the spokes of the rear wheel are connected. The outer is a cylindrical member arranged closely adjacent to the hub shell in the axial direction and engaged with an inner radially facing portion of a sprocket.

With such a bicycle, when the rider turns the pedals, the chain rotates the sprocket and the outer rotates integrally with the sprocket. Meanwhile, the one-way clutch causes the hub shell to rotate integrally with the outer main body and, as a result, the rear wheel rotates.

There have been proposals for an outer of this type that is designed for use with a multiple-sprocket cassette provided with a plurality of sprockets of different diameters so that a variety of speeds can be obtained by following a prescribed speed changing procedure. For example, a bicycle hub of this type is disclosed in Japanese Laid-Open Patent Publication No. 8-175459. The plurality of sprockets are arranged along the axial direction and each have an engaging section formed on an inner radially facing portion thereof, the engaging section comprising depressions and protrusions formed in a repeated manner along the circumferential direction. Meanwhile, the radially outward facing surface of the outer includes a rotation preventing section having a splines that run in the axial direction and are configured such that they can engage with the engaging sections of the sprockets.

In view of the above, it will be apparent to those skilled in the art from this disclosure that there exists a need for an improved bicycle hub. This invention addresses this need in the art as well as other needs, which will become apparent to those skilled in the art from this disclosure.

SUMMARY OF THE INVENTION

In the case of road racing bicycles and other competition-use bicycles, it is desirable to reduce the weight of the bicycle body to enable faster riding. In view of this desire, proposals have already been made for reducing the weight of the bicycle body by making the outer out of aluminum or other lightweight metal.

However, during power transfer, the rotation preventing section of the outer bears a large rotational load exerted by a sprocket. When the rider turns the pedals, the rotation preventing section of the outer main body is repeatedly pressed in the rotational direction by the engaging section of the sprocket. If the outer is made of aluminum, the splines of the rotation preventing section will undergo deformation, scratching, or fatigue.

In the particular case of an outer designed for multiple-sprockets, when, for example, one desires to replace a sprocket or sprockets, the sprockets must be removed by sliding them in the axial direction and it is necessary to also remove the sprockets that are located to the outside of the sprockets to be replaced. This work will be difficult if the rotation preventing section is deformed.

One object of the present invention is to provide a bicycle hub outer and bicycle hub that have improved strength at the portions where the loads from the sprockets are concentrated so as to enable the sprockets to be smoothly and easily replaced.

In accordance with one aspect of the present invention, a bicycle hub outer is configured to be mounted in a freely rotatable manner to the hub shaft of a bicycle hub and comprises an outer main body and an adapter. The outer main body is arranged on the radially inward side of a sprocket and provided with a first rotation preventing section that engages with an inner radially facing portion of the sprocket in such a manner that the outer main body cannot rotate relative to the sprocket.

The adapter is cylindrical, is mounted in a freely rotatable manner on an outer radially facing portion of the outer main body, and includes a second rotation preventing section that engages with an inner radially facing portion of the sprocket in such a manner that the adapter cannot rotate relative to the sprocket.

With this outer, the outer main body and the adapter can be made of different materials because they are separate entities. Also, since the adapter is arranged in the place where rotational loads from the sprocket are concentrated, it is possible to replace only the portion that is easily deformed.

In accordance with a second aspect of the present invention, a bicycle hub outer the first aspect of the present invention is configured such that the outer main body and the adapter are made of different materials.

With this outer, the strength of the adapter can be ensured while reducing the overall weight of the outer by, for example, making the adapter out of a hard material that does not readily deform and making the outer main body out of aluminum or other comparatively lightweight material.

In accordance with a third aspect of the present invention, a bicycle hub outer according to the first or second aspect of the present invention is configured such that the first and second rotation preventing sections have the same diametric cross sectional shape, are arranged closely adjacent to each other in the axial direction, and are prevented from rotating relative to each other by engaging simultaneously with one of the aforementioned sprockets.

With this outer, the sprocket(s) can be changed smoothly because the sprocket(s) can be slid axially over the entire outer. Additionally, since the two rotation preventing sections engage with one sprocket simultaneously, the outer main body and adapter are prevented from rotating with respect to each other.

In accordance with a fourth aspect of the present invention, a bicycle hub outer configured to be mounted in a freely rotatable manner to the hub shaft of a bicycle hub and comprises an outer main body and an adapter. The outer main body is cylindrical and arranged on the radially inward side of a sprocket. The adapter is cylindrical, is made of a different material than the outer main body, and has an inner engaging section provided on an inner radially facing portion thereof for mounting to an outer radially facing portion of the outer main body in such a manner that the adapter cannot rotate relative to the outer main body.

With this outer, it is not necessary for one sprocket to be engaged simultaneously with two rotation preventing sections because the inner engaging section prevents the adapter from rotating relative to the outer main body. Also, similarly to the second aspect of the present invention, the strength of the adapter can be ensured while reducing the overall weight of the outer by, for example, making the adapter out of a hard material that does not readily deform and making the outer main body out of aluminum or other comparatively lightweight material.

In accordance with a fifth aspect of the present invention, a bicycle hub outer according to fourth aspect of the present invention is provided such that the adapter includes a first rotation preventing section that engages with an inner radially facing portion of the sprocket in such a manner that adapter cannot rotate relative to the sprocket.

With this outer, the adapter can be removed from the outer main body and replaced even if the first rotation preventing section is deformed by a pressing force from the sprocket.

In accordance with a sixth aspect of the present invention, a bicycle hub outer according to the fifth aspect of the present invention is provided such that the outer main body includes a second rotation preventing section that engages with an inner radially facing portion of the sprocket in such a manner that outer main body cannot rotate relative to the sprocket. Also, the first and second rotation preventing sections have the same diametric cross sectional shape and are arranged closely adjacent to each other in the axial direction.

With this outer, the sprocket(s) can be changed smoothly because the sprocket(s) can be slid axially over the entire outer.

In accordance with a seventh aspect of the present invention, a bicycle hub outer according to any one of the fourth through sixth aspects of the present invention is provided such that the adapter is pressure fitted onto an outer radially facing portion of the outer main body.

With this outer, the adapter is pressure fitted with respect to the outer main body and is thereby mounted such that it cannot rotate relative to the outer main body.

In accordance with an eighth aspect of the present invention, a bicycle hub is provided that comprises a hub shaft, a bicycle hub outer, and a hub shell. The bicycle hub outer is a bicycle hub outer according to any one of the first through fifth aspects of the present invention that is mounted such that it rotates freely about the hub shaft. The hub shell is arranged closely adjacent to the bicycle hub outer in the axial direction and mounted such that it rotates freely about the hub shaft.

With this hub, when, for example, the chain of the bicycle rotates, the sprocket will rotate and the outer will rotate integrally with the sprocket. The torque from the outer is transferred to the hub shell and then through the spokes to the rear wheel.

With this bicycle hub, the outer main body and the adapter mounted on an outer radially facing portion of the outer main body can be made of different materials because they are separate entities. Also, since the adapter is arranged in the place where rotational loads imparted from the sprocket are large, it is possible to replace only the portion that is easily deformed.

With the present invention, the outer main body and the adapter can be made of different materials because they are separate entities. Also, since the adapter is arranged in the place where rotational loads from the sprocket are concentrated, it is possible to replace only the portion that is easily deformed.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
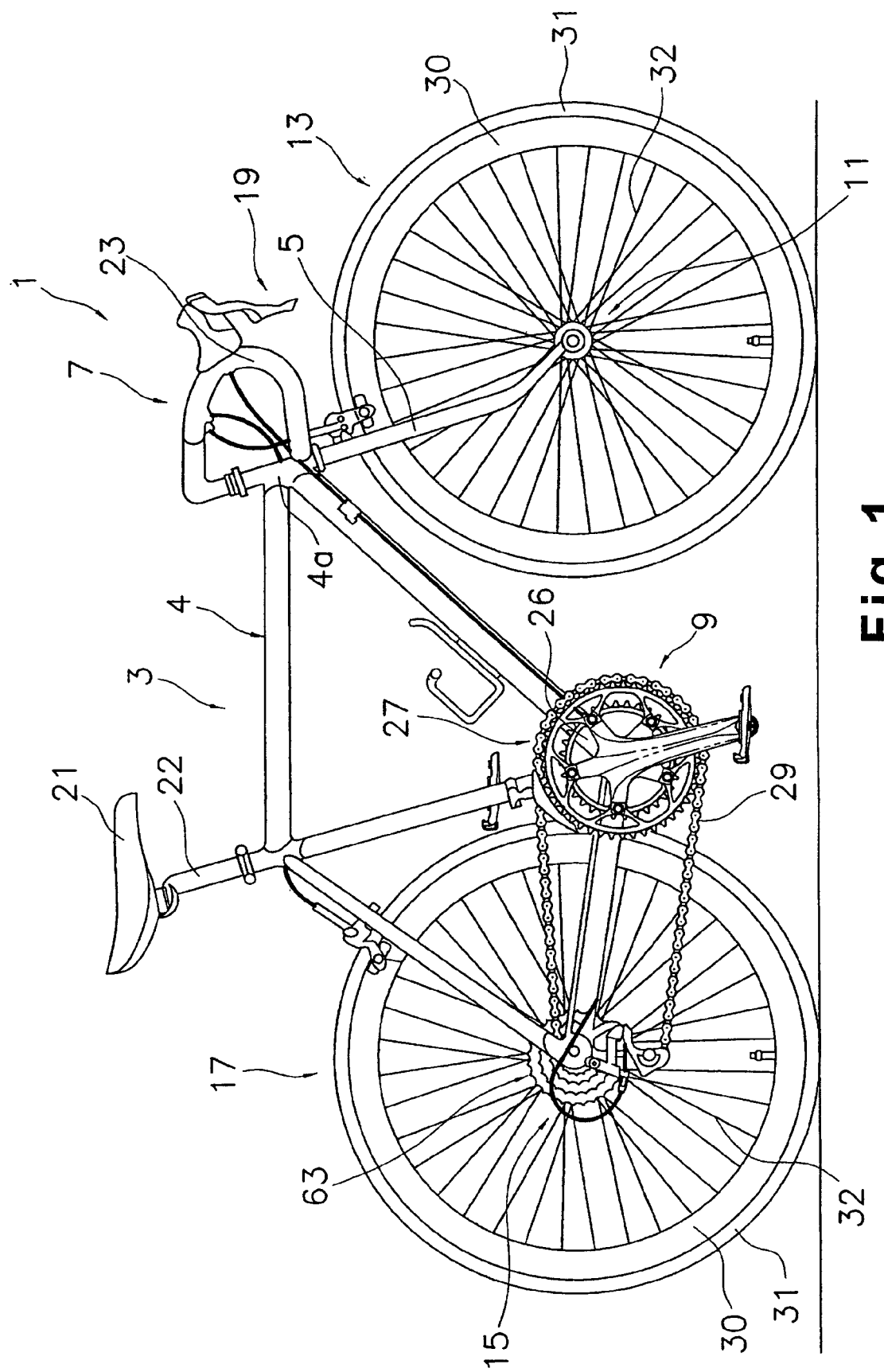
FIG. 1 is a side elevational view of a bicycle equipped with a bicycle hub in accordance with one embodiment of the present invention.

Referring initially to FIG. 1, a bicycle 1 is illustrated that is equipped with a rear bicycle hub 15 in accordance with one embodiment of the present invention. The bicycle 1 is a road racing bicycle having a frame 3 that constitutes the body framework of the bicycle. The frame 3 has a diamond-shaped frame main body 4 and a front fork 5 whose upper portion is mounted in a freely rotatable manner to a front end part 4a of the frame main body 4 and whose lower portion is divided into two prongs. The bicycle 1 is also provided with a handlebar unit 7, a drive unit 9, a front hub 11, a front wheel 13, a rear hub 15 and a pair of (front and rear) brake operating devices 19. The handlebar unit 7 is connected to the top end of the front fork 5. The drive unit 9 is arranged on a bottom portion of the frame main body 4 and is configured to convert the force the rider exerts against the pedals into a driving force. The front hub 11 is fastened to the bottom end o the front fork 5. The front wheel 13 is connected to the front hub 11. The rear hub 15 is connected to the rear end of the frame main body 4. The rear wheel 17 is connected to the rear hub 15. The front and rear brake operating devices 19 (only one shown in the FIG. 1) are configured for braking the front wheel 13 and rear wheel 17, respectively.

A seat post 22 with a saddle 21 mounted thereto is fastened to the frame main body 4 in such a manner that it can be moved up and down. The drive unit 9 includes the following: a gear crank 27 having three large-diameter gears and mounted in a freely rotatable manner to a lower end part 26 of the frame main body 4; ten small-diameter gears (plurality of sprockets) 63 constituting a portion of the rear hub 15; and a chain 29 spanned between the large-diameter gears and the small-diameter gears.

The front wheel 13 and rear wheel 17 are each provided with an annular rim 30, a tube-type tire 31 mounted to the outer radially facing portion of the rim 30, and a plurality of spokes 32 that extend generally radially inward from the inner radially facing portion of the rim 30 to either the front hub 11 or the rear hub 15

Figure 2:
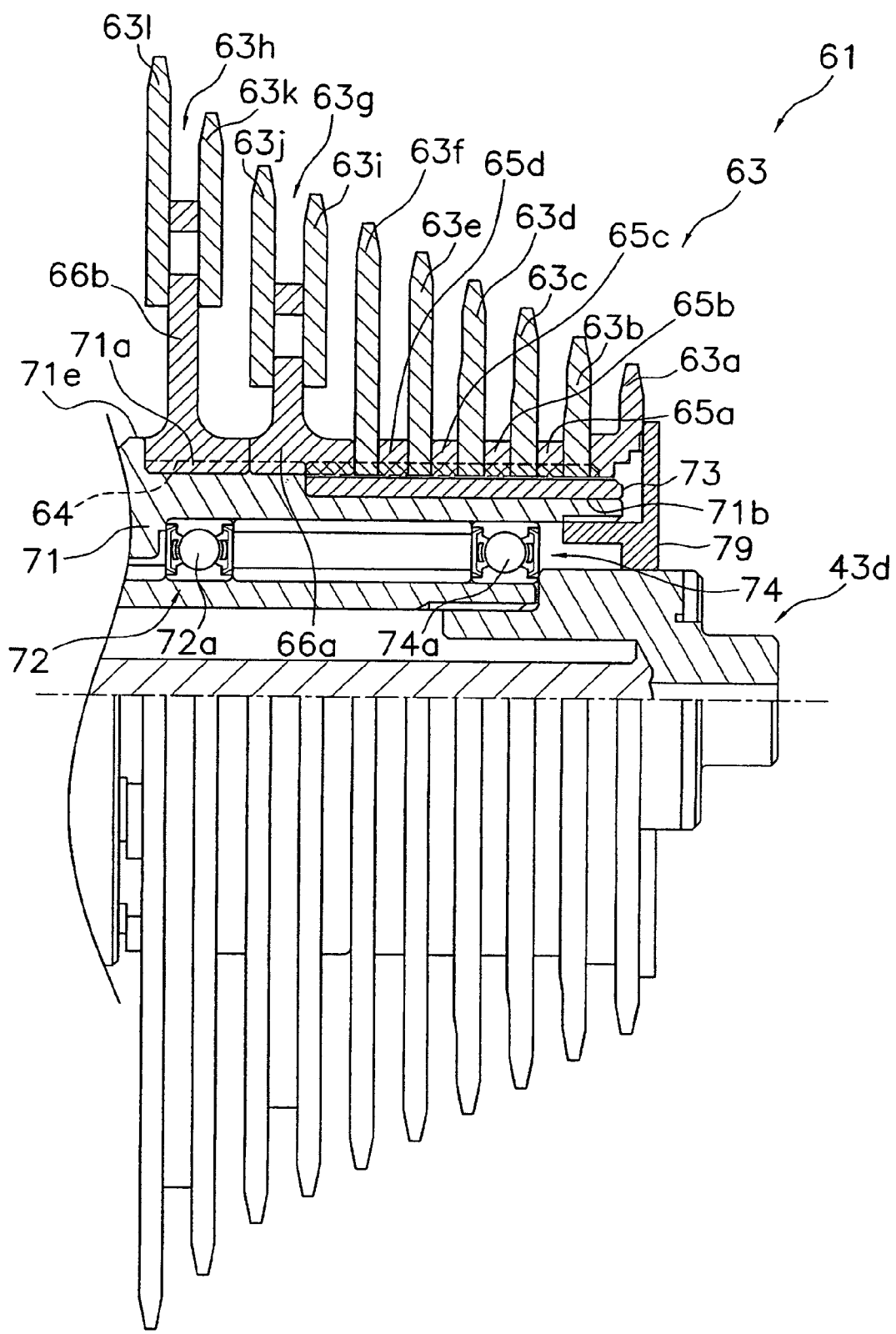
FIG. 2 is an enlarged partial side view of the bicycle hub shown in FIG. 1, with the upper portion shown in longitudinal cross section for showing a portion of the hub outer.

Referring now to FIG. 2, the sprockets 63 will now be described in more detail. The sprockets 63 include a first sprocket cluster or group of sprockets 63a to 63f, a second sprocket 63g, and a third sprocket 63h. The sprockets 63a to 63h become progressively larger in diameter as one moves from the smallest sprocket 63a to the largest sprocket 63h. Each of the sprockets 63a to 63h has an inner engaging section 64 provided on an inner radially facing portion thereof for engaging with the outer main body 71 and the adapter 73 (both described later). The engaging sections 64 all have the same shape in a diametrically cross sectional view. In other words, the engaging sections 64 of the sprockets 63a to 63h have an identical inner profile that is splined.

A spacer 65a to 65d is arranged axially-between each of the sprockets of the first sprocket cluster 63a to 63f, except for between sprockets 63a and 63b. When all of the sprockets 63 are in the set state (i.e., arranged axially along the outer radially facing portion of the outer main body 71), the first sprocket cluster 63a to 63f is engaged only with the rotation preventing section 73a (described later) of the adapter 73.

The second sprocket 63g has a tooth support member (inner support part) 66a disposed radially inwardly and two toothed members (outer toothed parts) 63i, 63j mounted on both axially facing sides of a radially outward portion of the tooth support member 66a. The tooth support member 66a has an engaging section 64 formed on an inner radially facing portion thereof. In the set state, the tooth support member 66a engages simultaneously with both the rotation preventing section 71a (described later) of the outer main body 71 and the rotation preventing section 73a of the adapter 73. The second sprocket 63g engages with each of the two rotation preventing sections 71a, 73a over the same axial length.

Similarly to the second sprocket 63g, the third sprocket 63h has a tooth support member 66b disposed radially inwardly and two toothed members 63k and 63l mounted on both axially facing sides of a radially outward portion of the tooth support member 66b. The tooth support member 66b has an engaging section 64 formed on an inner radially facing portion thereof (similarly to the tooth support part 66a). In the set state, the tooth support member 66b engages with both the rotation preventing section 71a of the outer main body 71.

Figure 3:
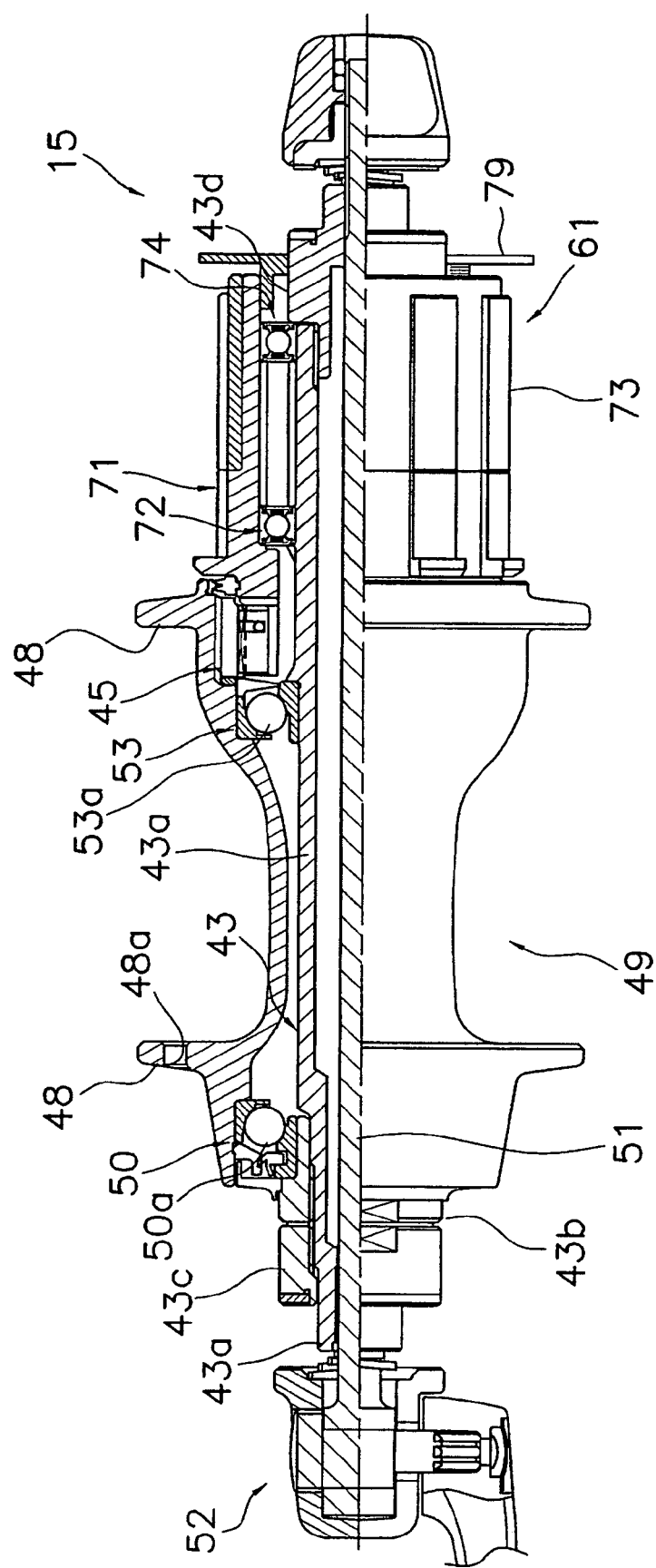
FIG. 3 is a partial longitudinal cross sectional view of the bicycle hub shown in FIGS. 1 and 2.

FIG. 3 shows a rear hub 15 in accordance with an embodiment of the present invention. This rear hub 15 is a quick-release hub provided with a quick-release unit 52 having a quick hub rod 51. The rear hub 15 is also provided with a hub shaft 43, a hub shell 49, a one-way clutch 45, hub assembly 61 and a pair of bearings 50 and 53.

The hub shaft 43 is arranged at the rotational center of the rear wheel 17. The hub shell 49 and the hub assembly 61 are supported in a freely rotatable manner on the hub shaft 43. The hub shaft 43 has a shaft part 43a that extends in a cylindrical manner, a ball pushing nut 43b for pressing against the balls 50a (described later) of the bearing 50 of the hub shell 49 mounted to the outside of the shaft part 43a, a loosening preventing nut 43c mounted to the shaft part 43a to prevent loosening of the ball pushing nut 43b, and a nut 43d for fixing the hub assembly 61 in the axial direction. A passage hole (not shown) in which the quick hub rod 51 is passed is formed in the shaft part 43a.

The hub shell 49 is a cylindrical body that has radially outwardly protruding flanges 48 formed on both axially facing sides thereof. The hub shell is mounted on the bearings 50 and 53 such that it can rotate freely about the hub shaft 43. The flanges 48 are provided with a plurality of spoke holes 48a that are arranged in the circumferential direction and configured such that the spokes 34 of the rear wheel 17 can be inserted therethrough.

The bearings 50 and 53 are arranged between the hub shell 49 and the hub shaft 43 and each has a plurality of balls 50a and 53a arranged circumferentially.

The one-way clutch 45 is arranged between the hub assembly 61 and the hub shell 49 and connects the hub assembly 61 and the hub shell 49 together in such a manner that they can rotate relative to each other in only one direction.

Figure 4:
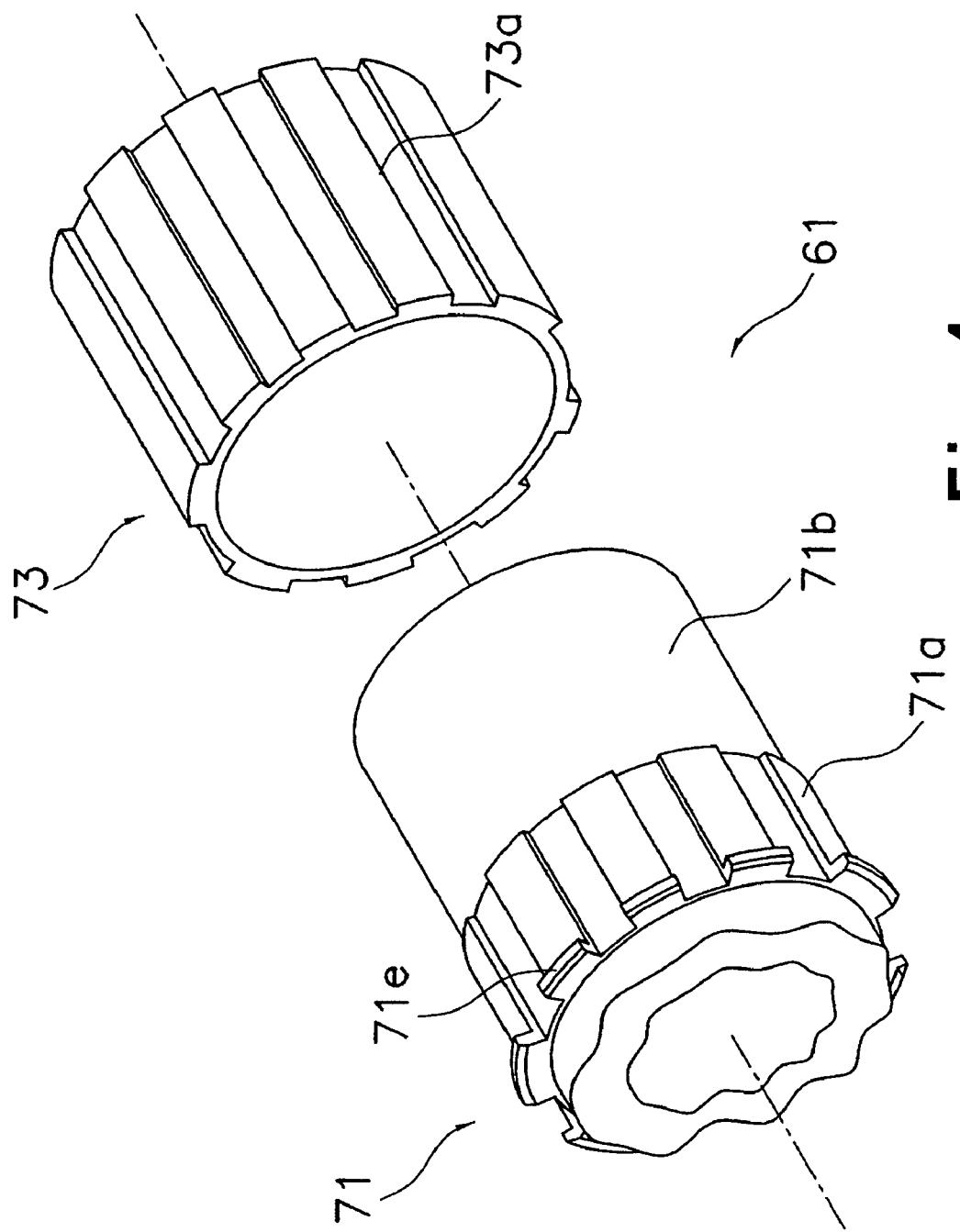
FIG. 4 is a partial exploded perspective view of a portion of the outer of the bicycle hub shown in FIGS. 1-3.

The hub assembly 61 is arranged closely adjacent to the hub shell 49 in the axial direction and, as shown in FIGS. 2 and 4, includes an outer main body 71, an adapter 73, a pair of bearings 72 and 74, and a stopper 79.

The outer main body 71 is a cylindrical member that can rotate integrally with the plurality of sprockets 63. The outer main body 71 is arranged on the radially inward side of the sprockets 63 and mounted on the bearings 72 and 74 such that it can rotate freely about the hub shaft 43. The outer main body 71 is made of a metal containing chiefly aluminum. As shown in FIG. 4, the outer main body 71 has a rotation preventing section 71a and an adapter mounting section 71b formed integrally on different axial regions of the outer main body 71.

The rotation preventing section 71a has axially running splines formed in The outer radially facing portion that is capable of engaging with the second and third sprockets 63g, 63h. The end of the rotation preventing section 71a that is closer to the hub shell 49 includes a stopper 79 for restricting movement of the tooth support member 66b of the third sprocket 63h toward the hub shell 49.

The adapter mounting section 71b is formed closely adjacent to the rotation preventing section 71a in the axial direction and has a smooth external surface of smaller diameter than the rotation preventing section 71a.

The adapter 73 is a cylindrical member that, similarly to the outer main body 71, can rotate integrally with the plurality of sprockets 63. The adapter 73 has a smooth internal surface and mounts to the adapter mounting section 71b of the outer main body 71. The outer radially facing portion of the adapter 73 has a splined rotation preventing section 73a for engaging with the first and second sprockets 63a to 63g in such a manner that the adapter 73 cannot rotate relative to the first and second sprockets 63a to 63g. The rotation preventing section 73a has the same diametric cross sectional shape as the rotation preventing section 71a of the outer main body 71. The adapter 73 is made of a metal containing mainly iron or titanium.

Similarly to the bearings 50 and 53, the bearings 72 and 74 are arranged between the hub shell 49 and the hub shaft 43 and each has a plurality of balls 72a, 74a arranged circumferentially.

The stopper 79 serves to secure the plurality of sprockets and prevent them from sliding axially and falling off. It is arranged on the end of the outer main body 71 where the adapter mounting section 71b is located and fastened to internal screw threads provided on the outer main body 71.

The operation will now be described. With such a bicycle 1, when the rider turns the pedals, the large-diameter gear rotates integrally with the gear crank 27 and causes the chain to circulate. As a result, the plurality of small sprockets 63 rotates and the outer main body 71 and adapter 73, which are engaged with the small sprockets 63, rotate integrally with the small sprockets 63. The one-way clutch 45 causes the outer main body 71 and the hub shell 49 to rotate integrally with each other and the rear wheel 17 rotates due to the spokes 35 connected to the hub shell 49.

If the chain 29 is engaged with one of the sprockets in the first sprocket cluster 63a to 63f, the torque from the sprocket will be imparted to the adapter 73 and transmitted to the outer main body 71 through the inner support part 66a of the second sprocket 63g. The torque is then transmitted sequentially from the outer main body 71 (which rotates integrally with the adapter 73) to the one-way clutch 45, the hub shell 49, and the rear wheel 17.

Although the adapter 73 bears rotational force from the sprocket, it does not easily deform and it resists scratching and fatigue because its strength has been improved by being made of a harder material than The outer main body 71. With this hub assembly 61, when, for example, one wishes to replace one of the sprockets, the sprockets located to the outside of the sprocket to be replaced can be slid smoothly in the axial direction.

Furthermore, with this hub assembly 61, since the adapter mounting section 73 of the outer main body 71 is formed toward the end portion of the hub shaft 43, assembly and disassembly of the hub assembly 61 can be accomplished more easily.

Additionally, since this hub assembly 61 uses an adapter 73 and a claw support member 75, the other component parts (e.g., the outer main body 71) can be made of a lightweight metal containing mainly aluminum, allowing the overall weight of the hub assembly 61 to be reduced.

Other Embodiments

Figure 5:
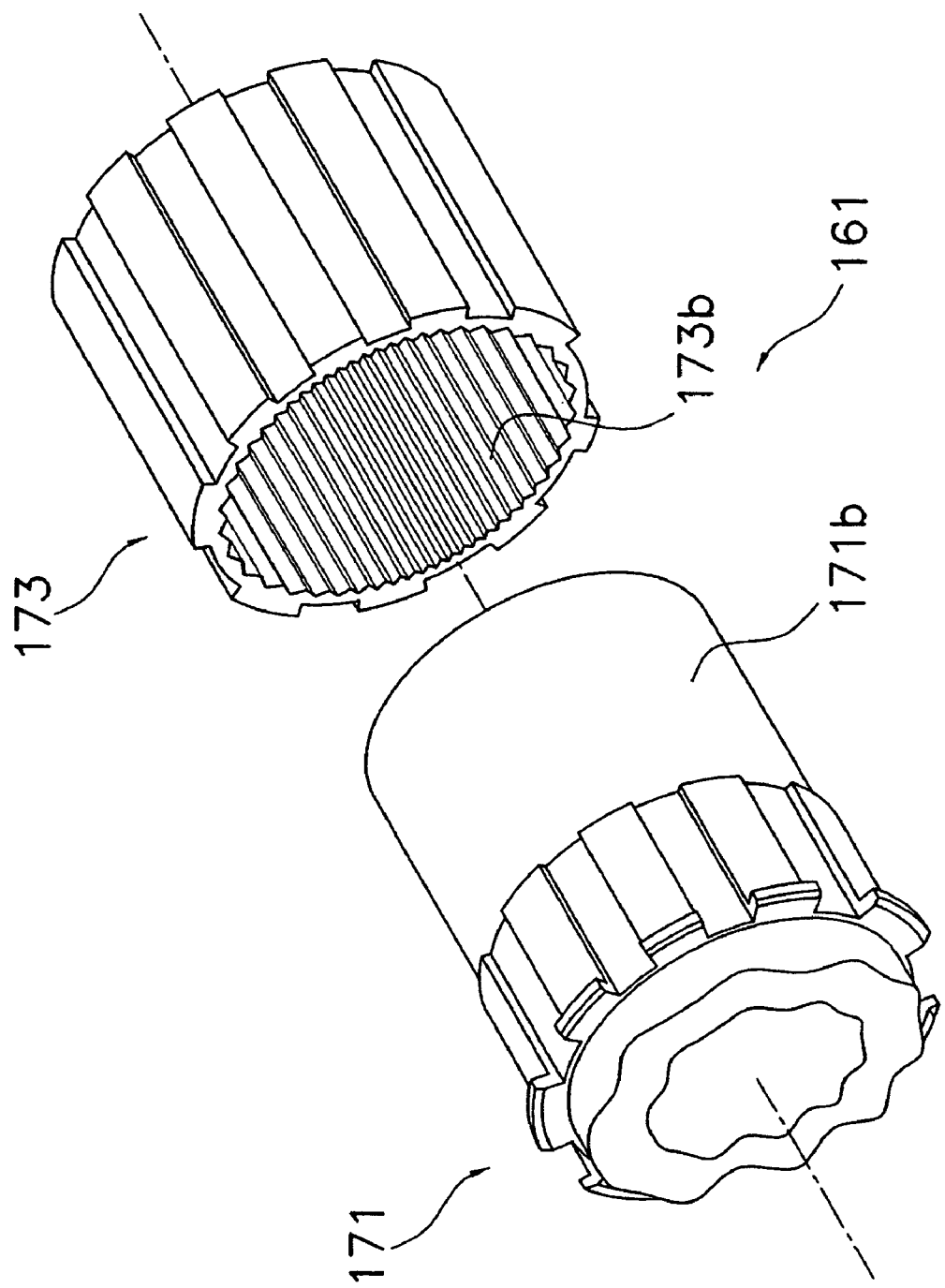
FIG. 5 is a partial exploded perspective view of a portion of the outer of a bicycle hub in accordance with another embodiment of the present invention.

Referring now to FIG. 5, an hub assembly 161 in accordance with a second embodiment will now be explained. The hub assembly 161 replaces the hub assembly 61 of the first embodiment. Thus, the remainder of the hub of the first embodiment is used with the hub assembly 161 of this embodiment. In view of the similarity between the first and second embodiments, the parts of the second embodiment that are identical to the parts of the first embodiment will be omitted for the sake of brevity.

In accordance with the second embodiment, it is also acceptable for the adapter 173 of the hub assembly 161 in accordance with the present invention to be provided, as shown in FIG. 5, with serrations 173b on an inner radially facing portion thereof so that the adapter 173 can be pressure fitted onto the outer main body 171 in such a manner that it cannot rotate relative thereto. It such a case, it is acceptable for the radially outward facing surface of the adapter mounting section 171b of the outer main body 171 to be smooth as shown in the figure or to be provided with serrations that can mesh with the serrations 173b.

Moreover, the mounting arrangement of the rear hub is not limited to a quick-release arrangement as shown in FIG. 2. It is also acceptable to use nuts. There are no particular limitations on the number or constituent features of the small-diameter and large-diameter sprockets.

As used herein to describe the above embodiments, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention. Moreover, the terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2003-272513. The entire disclosure of Japanese Patent Application No. 2003-272513 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub freewheel assembly configured to be mounted in a freely rotatable manner to a hub shaft of a bicycle hub, comprising:
   a cylindrical outer main body including a first outer radially facing portion having a first rotation preventing section configured to radially engage an inner radially facing part of at least one first sprocket such that the outer main body cannot rotate relative to the at least one first sprocket, the cylindrical outer main body also including a second outer radially facing portion; and
   a cylindrical adapter mounted in a freely rotatable manner on the second outer radially facing portion of the outer main body, the adapter including a second rotation preventing section configured to radially engage an inner radially facing part of at least one second sprocket such that the adapter cannot rotate relative to the at least one second sprocket.

2. The bicycle hub freewheel assembly as recited in claim 1, wherein
   the outer main body and the adapter are constructed of different materials.

3. The bicycle hub freewheel assembly as recited in claim 2, wherein
   the first and second rotation preventing sections have a generally identical diametric cross sectional shape that are arranged closely adjacent to each other in an axial direction, and that are prevented from rotating relative to each other by engaging simultaneously with one of the first and second sprockets.

4. The bicycle hub freewheel assembly as recited in claim 1, wherein
   the first and second rotation preventing sections have a generally identical diametric cross sectional shape that are arranged closely adjacent to each other in an axial direction, and that are prevented from rotating relative to each other by engaging simultaneously with one of the first and second sprockets.

5. The bicycle hub freewheel assembly as recited in claim 4, wherein the adapter is press fitted onto an outer radially facing portion of the outer main body.

6. A bicycle hub freewheel assembly configured to be mounted in a freely rotatable manner to a hub shaft of a bicycle hub, comprising:
a cylindrical outer main body including a first outer radially facing portion configured to radially engage an inner radially facing part of at least one first sprocket and a second outer radially facing portion, the first and second outer radially facing portions being formed as a single unitary element; and
a cylindrical adapter constructed of a different material than the outer main body, and including an inner engaging section having an inner radially facing surface engaging an outer surface of the second outer radially facing portion of the outer main body such that the adapter cannot rotate relative to the outer main body.

7. The bicycle hub freewheel assembly as recited in claim 6, wherein
the adapter includes a first rotation preventing section that engages an inner radially facing part of at least one second sprocket such that the adapter cannot rotate relative to the at least one second sprocket.

8. The bicycle hub freewheel assembly as recited in claim 7, wherein
the outer main body includes a second rotation preventing section that engages the inner radially facing part of the at least one first sprocket such that the outer main body cannot rotate relative to the at least one first sprocket; and
the first and second rotation preventing sections have generally an identical diametric cross sectional shape that are arranged closely adjacent to each other in an axial direction.

9. The bicycle hub freewheel assembly as recited in claim 7, wherein
the adapter is press fitted onto the second outer radially facing portion of the outer main body.

10. The bicycle hub freewheel assembly as recited in claim 6, wherein
the adapter is press fitted onto the second outer radially facing portion of the outer main body.

11. A bicycle hub comprising:
a hub shaft;
a bicycle hub freewheel assembly mounted to rotate freely about the hub shaft; and
a hub shell arranged closely adjacent to the bicycle hub outer in an axial direction and mounted to rotate freely about the hub shaft,
the hub freewheel assembly including
a cylindrical outer main body including a first outer radially facing portion having a first rotation preventing section configured to radially engage an inner radially facing part of at least one first sprocket such that the outer main body cannot rotate relative to the at least one first sprocket, the cylindrical outer main body also including a second outer radially facing portion, and
a cylindrical adapter mounted in a freely rotatable manner on the second outer radially facing portion of the outer main body, the adapter including a second rotation preventing section configured to radially engage an inner radially facing part of at least one second sprocket such that the adapter cannot rotate relative to the at least one second sprocket.

12. The bicycle hub as recited in claim 11, wherein
the outer main body and the adapter are constructed of different materials.

13. The bicycle hub as recited in claim 12, wherein
the first and second rotation preventing sections have a generally identical diametric cross sectional shape that are arranged closely adjacent to each other in an axial direction, and that are prevented from rotating relative to each other by engaging simultaneously with one of the first and second sprockets.

14. The bicycle hub as recited in claim 11, wherein
the first and second rotation preventing sections have a generally identical diametric cross sectional shape that are arranged closely adjacent to each other in an axial direction, and that are prevented from rotating relative to each other by engaging simultaneously with one of the first and second sprockets.

15. The bicycle hub as recited in claim 14, wherein
the adapter is press fined onto the second outer radially facing portion of the outer main body.

16. A bicycle hub comprising:
a hub shaft;
a bicycle hub freewheel assembly mounted to rotate freely about the hub shaft; and
a hub shell arranged closely adjacent to the bicycle hub freewheel assembly in an axial direction and mounted to rotate freely about the hub shaft,
the hub freewheel assembly including
a cylindrical outer main body including a first outer radially facing portion configured to radially engage an inner radially facing part of at least one first sprocket and a second outer radially facing portion, the first and second outer radially facing portions formed as a single unitary element, and
a cylindrical adapter constructed of a different material than the outer main body, and including an inner engaging section having an inner radially facing surface engaging an outer surface of the second outer radially facing portion of the outer main body such that the adapter cannot rotate relative to the outer main body.

17. The bicycle hub as recited in claim 16, wherein
the adapter includes a first rotation preventing section that engages an inner radially facing part of at least one second sprocket such that the adapter cannot rotate relative to the at least one second sprocket.

18. The bicycle hub as recited in claim 17, wherein
the outer main body includes a second rotation preventing section that engages the inner radially facing part of the at least one first sprocket such that the outer main body cannot rotate relative to the at least one first sprocket; and
the first and second rotation preventing sections have generally an identical diametric cross sectional shape that are arranged closely adjacent to each other in an axial direction.

19. The bicycle hub as recited in claim 17, wherein
the adapter is press fitted onto the second outer radially facing portion of the outer main body.

20. The bicycle hub as recited in claim 16, wherein
the adapter is press fitted onto the second outer radially facing portion of the outer main body.

* * * * *